United States Patent [19]

Umemura et al.

[11] Patent Number: 5,186,754
[45] Date of Patent: Feb. 16, 1993

[54] COATER

[75] Inventors: Masahiro Umemura; Takemasa Namiki; Seiichi Tobisawa; Shigetoshi Kawabe; Takeshi Nakajima, all of Hino, Japan

[73] Assignee: Konica Corporation, Tokyo, Japan

[21] Appl. No.: 505,937

[22] Filed: Apr. 6, 1990

[30] Foreign Application Priority Data

Apr. 7, 1989 [JP] Japan .................................. 1-89302

[51] Int. Cl.$^5$ ............................ B05C 5/02; B05C 9/06
[52] U.S. Cl. .................................... 118/411; 118/419; 427/131; 427/356; 427/419.3
[58] Field of Search ....................... 118/410, 411, 419; 425/133.5; 427/131, 356, 419.3

[56] References Cited

U.S. PATENT DOCUMENTS

| | | | |
|---|---|---|---|
| 3,206,323 | 9/1965 | Miller et al. | 118/411 |
| 3,508,947 | 4/1970 | Hughes | 118/325 |
| 3,611,492 | 10/1971 | Scheibling | 425/113 |
| 4,094,947 | 6/1978 | Alfrey, Jr. et al. | 425/133.5 |
| 4,424,762 | 1/1984 | Tanaka et al. | 118/410 |
| 4,480,583 | 11/1984 | Tanaka et al. | 118/410 |
| 4,581,254 | 4/1986 | Cunningham et al. | 118/410 |
| 4,681,062 | 7/1987 | Shibata et al. | 118/410 |
| 4,854,262 | 8/1989 | Chino et al. | 118/411 |
| 4,874,633 | 10/1989 | Komatsu et al. | 427/48 |
| 4,995,339 | 2/1991 | Tobisawa et al. | 118/410 |
| 5,042,422 | 8/1991 | Tobisawa et al. | 118/410 |
| 5,072,688 | 12/1991 | Chino et al. | 118/411 |

FOREIGN PATENT DOCUMENTS

| | | |
|---|---|---|
| 83-109162 | 9/1983 | Japan . |
| 83-189070 | 2/1984 | Japan . |
| 86-111168 | 10/1986 | Japan . |
| 87-124631 | 11/1987 | Japan . |
| 87-214524 | 3/1988 | Japan . |
| 88-164022 | 11/1988 | Japan . |
| 88-164023 | 11/1988 | Japan . |

Primary Examiner—Michael G. Wityshyn
Attorney, Agent, or Firm—Jordan B. Bierman

[57] ABSTRACT

An extruder for coating magnetic layers onto electromagnetic recording tape is disclosed, which is provided with two reservoirs and two outlet channels so as to permit simultaneous coating of two layers. The two outlet channels meet at an angle and merge into a single outlet channel, which extrudes the two layers between a front edge and a rear edge. The front edge has a shape of curvature, and the rear edge protrudes beyond a tangential line drawn from the end of the front edge curvature. The extruder is capable of producing double layered magnetic tape with or without a mixed zone between layers.

10 Claims, 3 Drawing Sheets

COATER

FIELD OF THE INVENTION

The present invention relates to an extrusion type coating apparatus that forms a plurality of various coating layers on a flexible support which is travelling.

BACKGROUND OF THE INVENTION

It is well-known fact that there are various methods of coating various paint films on a flexible support which runs, such as roll coating, gravure coating, extrusion coating, slide bead coating and curtain coating.

A magnetic recording medium is obtained by, for example, coating and drying a magnetic paint solution on a support. Coating methods generally used for this purpose include roll coating, gravure coating and extrusion coating. Of these methods, extrusion coating is superior to the others since it provides uniform coat thickness.

On the other hand, with the recent rapid progress of improvement of magnetic recording media themselves, there have been increasing demands for use of magnetic powder of oxides with high BET values and barium ferrite materials, and the viscosity of coating solution has tended to increase.

There have also been increasing demands for high speed coating for increased productivity.

Also, recent trends in magnetic recording media have involved the formation of an under coat layer and/or interlayer, the formation of magnetic layer thereon, and multiplication of magnetic layer.

By the way, known conventional methods of extrusion coating mainly for the purpose of production of magnetic recording media include those described in Japanese Patent Publication Open to Public Inspection Nos. 84771/1982, 104666/1983 and 238179/1985.

Known prior art of multiple-layer coating includes the methods described in Japanese Patent Publication Open to Public Inspection Nos. 164022/1988, 164023/1988, 214524/1987, 124631/1987 and 92132/1987 and Japanese Patent Examined Publication No. 17291/1982.

The present inventors previously proposed in Japanese Patent Application No. 34859/1988 an extrusion type coating head comprising an apparatus which satisfies the demands described above and which continuously extrudes a coating solution onto the surface of a flexible support which runs continuously along the front and back edge faces via the slit between the front and back edge faces and applies the coating solution on the face of the support, wherein the end portion of said front edge has an arc face with a curvature radius of $r_1$ to the end tip, wherein the entire face of said back edge is an arc face with a curvature radius of $r_2$, wherein these curvature radii satisfy the requirements specified by the following formulas:

$$3 \text{ mm} < r_2 < 20 \text{ mm}$$

$$1 \text{ mm} < r_1 < r_2/2 \text{ mm}$$

and wherein at least a portion of the back edge face is projected beyond the tangent line at the end tip of the front edge face.

This extrusion type coating head is schematized in FIG. 1A and FIG. 1B.

This extrusion type coating head, when used to coat a single layer, is advantageous in that neither uneven coating nor streaking occurs and that excellent coating performance is obtained even under high speed coating conditions.

However, when using two units of this head for so called wet (sequential) multiple-layer coating, in which an upper layer is formed while the previously coated lower layer remains in a wet state, the lower layer is scraped off during upper layer coating and thus it is difficult to coat the upper layer stably in cases where the viscosity of the magnetic solution for the lower layer is lower than the coating solution for the upper layer.

In addition, this tendency occurs not only in the use of this head is used but also it is normally noted in cases where an extrusion type coating head for single layer coating is used.

Taking note of this situation, the present inventors proposed in the specification for a recent patent application (Japanese patent application filed on Mar. 20, 1989 under the title of COATING APPARATUS) an invention which permits simultaneous coating (so called wet-on-wet multiple-layer coating) of a lower layer and an upper layer on a support in a wet state by means of a single extrusion type coating head, the invention comprising "a coating apparatus which continuously extrudes a coating solution onto the surface of a flexible support which runs sequentially and continuously along the front, center and back edge faces via each of the first slit between the front and center edge faces and the second slit between the center and back edge faces and applies the coating solution on the face of the support, wherein the end portion of said front edge has at least a linear portion along the running direction, wherein said linear portion has a length of not more than 1 mm, and wherein at least a portion of the center and back edge faces is projected toward the support side beyond the line extended from the linear portion".

This coating apparatus is schematized in FIG. 2.

This coating apparatus permits simultaneous coating of a lower layer and an upper layer on a support even when the viscosity of the lower layer coating solution is lower than that of the upper layer coating solution, but it is hard to say that multiple-layer coating can be achieved without any hamper even in cases where the paint film of the lower layer is sufficiently thin.

With this background, the present inventors made various investigations of methods which permit wet multiple-layer coating without any hamper even in cases where the viscosity of the lower layer coating solution is lower than that of the upper layer coating solution and where the paint film of the lower layer is sufficiently thin, and found that this purpose can be accomplished by use of an extrusion type coating apparatus as described below. The present inventors made further investigations based on this finding, and developed the present invention.

SUMMARY OF THE INVENTION

Accordingly, the present invention relates to an "extrusion type coating apparatus having two liquid reservoirs therein and a slit (channel) portion extended from each liquid reservoir along the direction of liquid discharge and configured so that the two slits (channels) bind together to form a single slit (channel) in the vicinity of the discharge portion".

The extrusion type coating apparatus of the present invention is schematized FIG. 3.

A preferred mode of embodiment of the extrusion type coating apparatus of the present invention can be said to be such that in which the shapes of the front and back edge faces are the same as, or similar to, those of the above-mentioned extrusion type coating head disclosed in Japanese Patent Application No. 34859/1988. However, the gist of the extrusion type coating apparatus of the present invention resides not in the shapes of the front and back edge faces but in its internal structure.

Therefore, the shapes of the front and back edge faces in the extrusion type coating apparatus of the present invention must not necessarily be the same as, or similar to, those of the above-mentioned extrusion type coating head disclosed in Japanese Patent Application No. 4859/1988; any known shapes are acceptable.

It is desirable, however, that in the extrusion type coating apparatus of the present invention as well, a part of Back Edge 2 be projected beyond the tangent line $l_1$ at the Downstream End B of the front edge face (projected almost upwards in FIGS. 1A and 1B) as seen in FIGS. 1A, 1B, and 3.

Figure 1A:
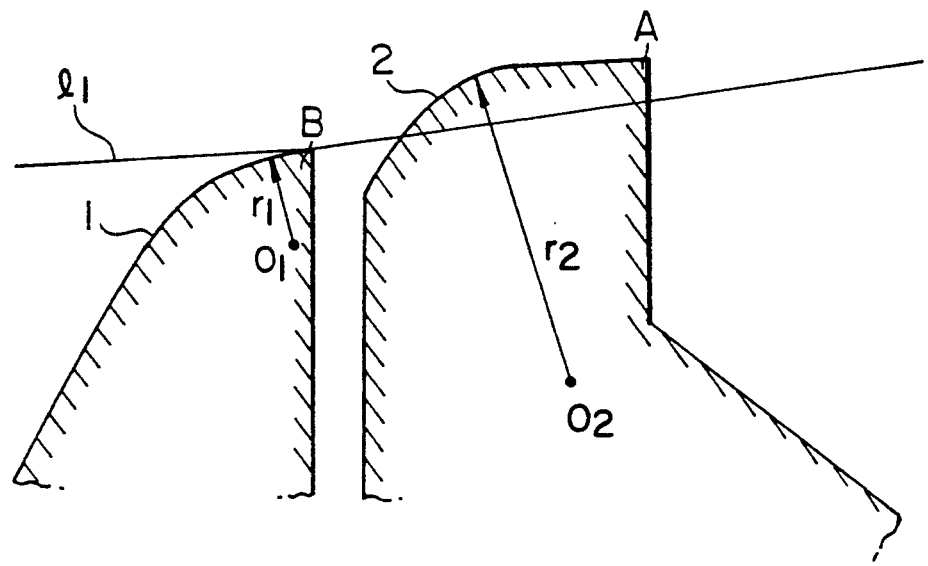
FIGS. 1A and 1B are cross-sectional views of the extrusion type coating head disclosed in Japanese Patent Application No. 34859/1988.

1: Front edge face
2: Back edge face
3: Slit
4: Liquid Reservoir
5: Liquid Reservoir
6: Slit
7: Slit
8: Feed roll
9: Support
10: Extrusion coating apparatus of the invention
11: Drier
12: Calender roll
13: Winding roll
A: Downstream end of back edge
B: Downstream end of front edge

DETAILED DESCRIPTION OF THE INVENTION

In the extrusion type coating apparatus of the present invention, it is preferable that the angle $\theta$ (of Slit 6 extended from Liquid Reservoir 4 along the direction of liquid discharge and Slit 7 extended from Liquid Reservoir 4 along the direction of liquid discharge) be not less than 5° and less than 170°, normally between 10° and 80°.

When the angle $\theta$ is not more than 5°, uneven coating occurs easily since it is difficult to realize for structure-related reasons, so this situation is undesirable. Meanwhile, when the angle $\theta$ is over 170°, disturbance in the interface between the two liquids leads to easy mixing of the upper and lower layer coating solutions.

It is also preferable that the length of Slit 3, namely the single slit formed by Slits 6 and 7 as bound together meet the following equation:

$$0 < L < 100 \text{ mm}$$

Normally, L desirably satisfies $0 < L < 50$ mm, and is preferably 0.5 to 30 mm. When L is over 100 mm, disturbance in the interface between the two liquids leads to easy mixing of the upper and lower layer coating solutions.

The present invention is hereinafter described in more detail by means of the following examples and comparison example.

EXAMPLES

Examples 1 through 9 and Comparison Example 1

Figure 4:
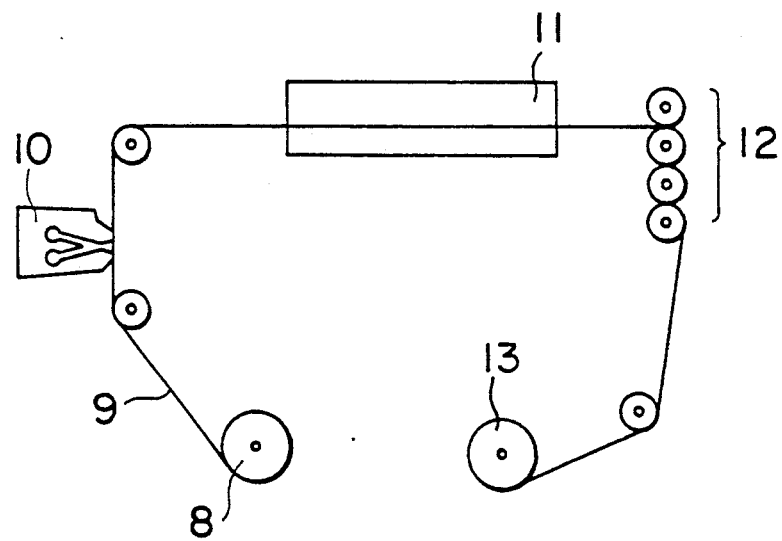
FIG. 4 is a diagram of the production scheme of the magnetic recording medium

A polyethylene terephthalate film with a thickness of 15 μm as the support was coated with magnetic solutions with the compositions shown in Tables 1 and 2 for multiple-layer coating using the extrusion type coating head of the present invention in accordance with the process flow shown in FIG. 4 under the production conditions shown below, followed by drying to yield a magnetic recording medium.

Production conditions

Lower layer coating solution viscosity: 500 centipoise (as determined with B type viscometer after 1 minute of rotation at 360 rpm; the same applies below) and 1000 centipoise.

Upper layer coating solution viscosity: 4000 centipoise. Dry film thickness: 1.0 μm for upper layer, 3.0 μm for lower layer.

Coating speed: 200 m/min.

TABLE 1

| Coating solution composition (upper layer) | |
|---|---|
| Component | Ratio (parts by weight) |
| Co-containing magnetic iron oxide (BET value 45 m²/g) | 150 |
| Polyurethane resin (produced by Nippon Polyurethane Industry Co., Ltd., tradename N3132) | 20 |
| Vinyl chloride-vinyl acetate copolymer (produced by Union Carbide Co., tradename VAGH) | 20 |
| Alumina powder | 10 |
| Myristic acid | 2 |
| Butyl stearate | 1 |
| Polyisocyanate (produced by Nippon Polyurethane Industry Co., Ltd., tradename Coronate L) | 10 |
| Toluene | 200 |
| Methyl ethyl ketone | 200 |
| Carbon Black | 10 |

TABLE 2

| Coating solution composition (lower layer) | |
|---|---|
| Component | Ratio (parts by weight) |
| Co-containing magnetic iron oxide (BET value 30 m²/g) | 150 |
| Polyurethane resin (produced by Nippon Polyurethane Industry Co., Ltd., tradename N3132) | 7 |
| Vinyl chloride-vinyl acetate copolymer (produced by Union Carbide Co., tradename VAGH) | 20 |
| α-alumina powder | 8 |

TABLE 2-continued

Coating solution composition (lower layer)

| Component | Ratio (parts by weight) |
| --- | --- |
| Myristic acid | 0.65 |
| Butyl stearate | 1 |
| Stearic acid | 0.35 |
| Polyisocyanate (produced by Nippon Polyurethane Industry Co., Ltd., tradename Coronate L) | 10 |
| Toluene | 150 |
| Methyl ethyl ketone | 150 |
| Carbon Black | 5 |
| Oleic acid | 0.65 |

Figure 1B:
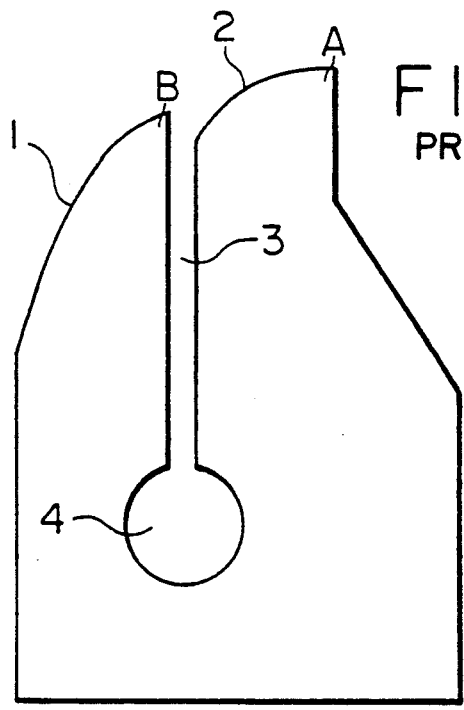

Table 3 shows the results of examination of the upper layer coating state obtained by multiple-layer coating using the extrusion type coating head of the present invention with the sizes of L and θ varied (Examples 1 through 9) in comparison with those obtained in wet multiple-layer coating using two units of the extrusion type coating head disclosed in Japanese Patent Application No. 34859/1988 (see FIG. 1A and FIG. 1B) (Comparison Example 1).

TABLE 3

| | Upper layer coating state | |
| --- | --- | --- |
| | Lower layer viscosity (centipoise) | |
| | 1000 | 500 |
| Comparison Example 1 | Δ | x |
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Example 7 | ○ | ○ |
| Example 8 | ○ | ○ |
| Example 9 | ○ | ○ |

Evaluation criteria
○ Good
Δ Slightly poor
x Poor

As is evident from Table 3, the use of the extrusion coatability for the upper layer even when the viscosity of the lower layer is lower than that of the upper layer.

Note that the extrusion type coating head of the present invention used in Examples 1 through 9 had the dimensions shown in Table 4.

TABLE 4

| | Dimensions of parts | |
| --- | --- | --- |
| | L (mm) | θ (degrees, °) |
| Example 1 | 30 | 23.5 |
| Example 2 | 30 | 40.0 |
| Example 3 | 30 | 10.0 |
| Example 4 | 12 | 15.0 |
| Example 5 | 3 | 10.0 |
| Example 6 | 50 | 80.0 |
| Example 7 | 80 | 80.0 |
| Example 8 | 80 | 50.0 |
| Example 9 | 90 | 50.0 |

Example 10 and Comparison Example 2

Magnetic recording media were produced using the same support and magnetic solutions as in Examples 1 through 9 in the same manner as in Examples 1 through 9 except that coating conditions were slightly changed. The production conditions were as follows:

Upper and lower layer coating solution viscosity: 1500 centipoise (as determined with B type viscometer after 1 minute of rotation at 60 rpm).

Coating speed: 150 m/min.

Figure 2:
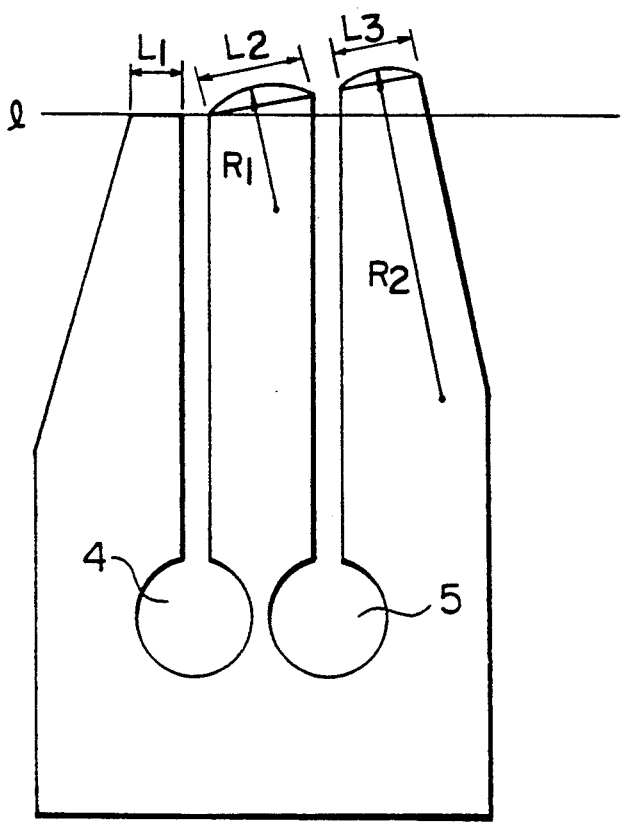
FIG. 2 is a cross-sectional view of the extrusion type coating head of the prior art.
Figure 3:
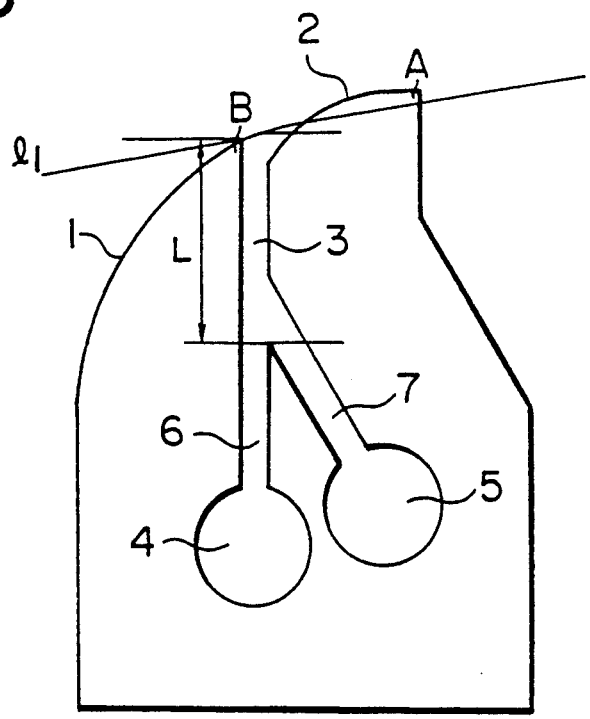
FIG. 3 is a cross-sectional view of the extrusion type coating head of the present invention.

Table 5 shows the values of coatability obtained in accordance with the present invention (Example 6) in comparison with those obtained in wet multiple-layer coating using the coating apparatus disclosed in the specification for the above-mentioned patent application filed on Mar. 20, 1989 (title: COATING APPARATUS, hereinafter referred to as the prior art) (the same as the extrusion type coating head illustrated in FIG. 2, wherein $R_1=8$ mm, $R_2=20$ mm, $L_1=0.8$ mm, $L_2=L_3=2.5$ mm) (Comparison Example 2).

TABLE 5

| Dry film thickness (μm) | | Coatability | |
| --- | --- | --- | --- |
| Upper layer | Lower layer | Example 6 | Comparison Example 2 |
| 3.0 | 1.0 | ○ | ○ |
| 3.5 | 0.5 | ○ | Δ |
| 3.7 | 0.3 | ○ | x |

Evaluation criteria
○ Good
Δ Slightly poor
x Poor

As seen from Table 5, coatability lowers as the film thickness of the lower layer decreases when using the coating apparatus of the prior art, while good capability is obtained irrespective of the film thickness of the lower layer when using the coating apparatus of the present invention.

Example 11 and Comparison Example 3

Magnetic recording media were produced using the same support and magnetic solutions as in Example 10 in the same manner as in Example 10 except that coating conditions were slightly changed. The production conditions were as follows:

Upper layer film thickness after drying: 3.4 μm
Lower layer film thickness after drying: 0.6 μm Table 6 shows the values of coatability obtained in accordance with the present invention (Example 11) in comparison with those obtained in wet multiple-layer coating using the coating apparatus of the prior art, used in Comparison Example 2, (Comparison Example 3).

TABLE 6

| Coating speed | Coatability | |
| --- | --- | --- |
| | Example 7 | Comparison Example 3 |
| 100 m/min. | ○ | ○ |
| 200 m/sec. | ○ | Δ |
| 300 m/sec. | ○ | x |

Evaluation criteria
○ Good
Δ Partial coating unevenness
x Frequent coating unevenness As is evident from Table 6, coatability lowers as coating speed increases when using the coating apparatus of the prior art, while good coatability is obtained irrespective of coating speed when using the coating apparatus.

The present invention permits multiple-layer coating in a stable state without any hamper (without scraping off the lower layer coating solution by the upper layer coating solution even when wet multiple-layer coating is performed at high coating speeds when the viscosity of the lower layer coating solution is lower than that of the upper layer coating solution and the lower layer is sufficiently thin.

What is claimed is:

1. An apparatus for coating a plurality of layers of electro magnetic material onto a flexible base comprising:

an extruder; and a transporter for moving a flexible base in a direction from a front face to a back face of said extruder;

wherein said extruder comprises (a) a first reservoir connected to a pressurized supply source of a first coating material for forming a first coating layer;

(b) a second reservoir connected to a pressurized supply source of a second coating material for forming a second coating layer;

(c) a first outlet channel which is connected to said first reservoir to extrude said first coating material;

(d) a second outlet channel which is connected to said second reservoir to extrude said second coating material;

(e) a third outlet channel between said front face and said back face to extrude said first coating material and said second coating material to provide said first layer and said second layer on said base;

said first outlet channel and said second outlet channel converging into said third outlet channel at an angle;

wherein a part of said back face projects beyond a tangent line which is tangent to said front face at a downstream end of said front face in a cross section of said extruder.

2. An apparatus of claim 1, wherein the length L of the third outlet channel is expressed as $0 < L < 100$ mm.

3. An apparatus of claim 1 wherein the length L of the third outlet channel is expressed as $0 < L < 50$ mm.

4. An apparatus of claim 1 wherein the length L of the third outlet channel is expressed as $0.5 \text{ mm} < L < 30$ mm.

5. An apparatus of claim 1, wherein the first outlet channel and the second outlet channel meet at the angle not more than 170° and not less than 5°.

6. The apparatus of claim 1 wherein said base is in contact with said extruder along said front face and said back face.

7. The apparatus of claim 1 wherein said third outlet channel is more than 0 mm and less than 100 mm in length.

8. The apparatus of claim 7 wherein said length is less than 50 mm.

9. The apparatus of claim 8 wherein said length is 0.5 mm to 30 mm.

10. An apparatus for coating a plurality of layers of electro magnetic material onto a flexible base comprising:

an extruder; and a transporter for moving a flexible base in a direction from a front face to a back face of said extruder;

wherein said extruder comprises (a) a first reservoir connected to a pressurized supply source of a first coating material for forming a first coating layer;

(b) a second reservoir connected to a pressurized supply source of a second coating material for forming a second coating layer;

(c) a first outlet channel which is connected to said first reservoir to extrude said first material;

(d) a second outlet channel which is connected to said second reservoir to extrude said second material;

(e) a third outlet channel between said front face and said back face to extrude said first coating material and said second coating material to provide said first layer and said second layer on said base, said first outlet channel and said second outlet channel converging into said third outlet channel at an angle which is from 10° to 80°, a part of said back face projecting beyond a tangent line which is tangent to said front face at a downstream end of said front face in a cross section of said extruder, said front face having a radius of curvature $r_1$ to said end of said front face and the entire said back face has a radius of curvature $r_2$ in a cross section of said extruder, wherein $r_2$ is more than 3 mm and less than 20 mm, and $r_1$ is more than 1 mm and less than one half $r_2$.

* * * * *